United States Patent
Irons et al.

[15] 3,660,828
[45] May 2, 1972

[54] METHOD AND APPARATUS FOR RECORDING TRANSIENT SIGNALS

[72] Inventors: Henry R. Irons, Adelphi; Leonard J. Schwee, Silver Spring, both of Md.

[73] Assignee: The United States of America as represented by the Secretary of the Navy

[22] Filed: Jan. 14, 1970

[21] Appl. No.: 2,757

[52] U.S. Cl. ....................................................340/174 TF
[51] Int. Cl. ..........................................................G11c 11/14
[58] Field of Search ............................................340/174 TF

[56] References Cited

UNITED STATES PATENTS 3,457,554  7/1969  White et al. ...........................340/174

Primary Examiner—James W. Moffitt
Attorney—R. S. Sciascia and J. A. Cooke

[57] ABSTRACT

A method and apparatus for recording transient signals of extremely short duration on a thin film medium. A uniaxially anisotropic film having easy and hard axes of magnetization is located adjacent an input signal conductor and a scanning conductor. The scanning conductor is energized to produce a high intensity field which sweeps along the film parallel to its hard axis, while the input conductor applies the signal to be recorded to the film along its easy axis. The film may be exposed to a constant gradient field to insure that the recording faithfully represents the amplitude of the input signal.

9 Claims, 6 Drawing Figures

PATENTED MAY 2 1972          3,660,828

INVENTORS
Henry R. Irons
Leonard J. Schwee

BY  J. O. Tresansky
ATTORNEY

INVENTORS
Henry R. Irons
Leonard J. Schwee

BY

ATTORNEY

INVENTORS
Henry R. Irons
Leonard J. Schwee

BY

ATTORNEY

3,660,828

METHOD AND APPARATUS FOR RECORDING TRANSIENT SIGNALS

BACKGROUND OF THE INVENTION

This invention generally relates to the art of signal recordation and in particular to a method and apparatus for permanently recording transient signals of short duration.

Scientific experimentation often requires the study of transient electrical signals of short duration as may be generated by high energy explosions or high speed computer synchronization circuitry. These signals, which may be impulses of only a few nanoseconds duration, must be permanently and accurately recorded to permit their proper analysis.

Presently available recording techniques, however, exhibit various deficiencies which render them somewhat unsuitable for recording duration transients under many circumstances. Magnetic tape recorders, for example, lack the high frequency response necessary to record impulses of durations on the order of a few nanoseconds. Some cathode ray oscilloscopes, in turn, have the frequency response necessary to display nanosecond impulses, but are large, complex and costly instruments, impractical for use in many types of on site studies, as well as in rocket propelled scientific probes and scientific satellites. In addition, oscilloscope traces are themselves transient, so that special cameras and photographic film are required to obtain permanent records of them, thus further complicating the process of oscilloscopic data recording.

SUMMARY OF THE INVENTION

Accordingly, one object of this invention is to provide a compact and inexpensive device particularly suitable for accurately recording transient signals of short duration.

Another object of this invention is to provide an improved method of permanently and accurately recording electrical impulses of very short duration.

Still another object of this invention is the provision of an easily fabricated, compact apparatus for accurately recording magnetic signals of short duration.

Another object of the invention is to provide a compact, easily fabricated device for accurately recording a plurality of signals simultaneously.

Briefly, these and other objects are achieved by applying an input signal to a thin film of a uniaxially anisotropic magnetic material while the film is simultaneously progressively strobed by a scanning field thereby forming a permanent magnetic record of the input signal in the thin film. The record is made to accurately represent the magnitude of the input signal by carrying out the recording process in the presence of a static field of constant gradient.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein.

DESCRIPTION OF THE PREFERRED EMBODIMENT

Figure 1:
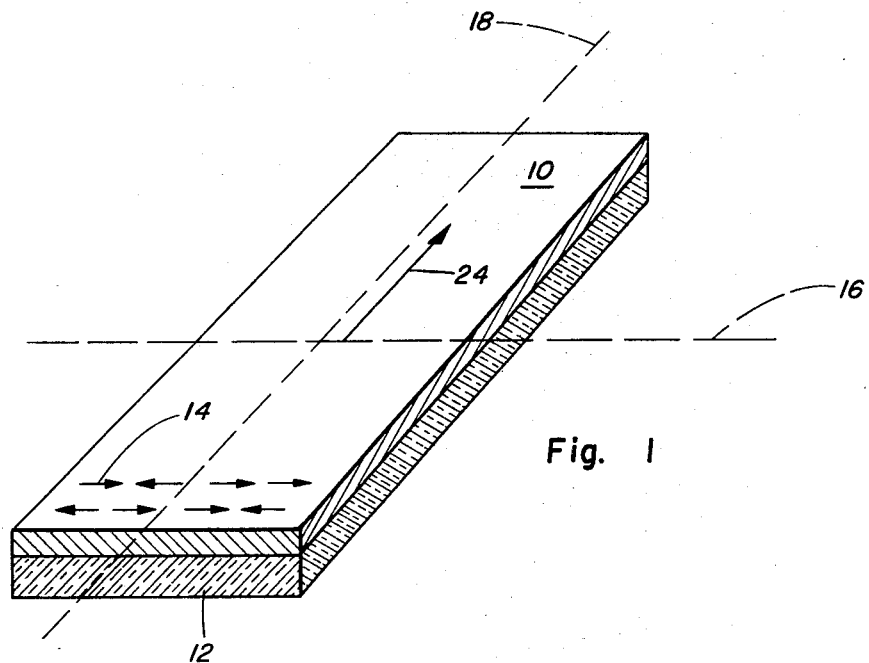
FIG. 1 is a perspective view of a magnetic thin film.

Referring now to the drawings wherein like reference characters designate identical or corresponding parts throughout the several views, and more particularly to FIG. 1 thereof, there is shown a thin magnetic film 10 coated on a dielectric substrate 12, which may be formed of glass or any other suitable nonmagnetic material. Thin film 10, which is to be the recording medium, is preferably a layer about 500 angstrom units thick of an 80 percent nickel and 20 percent iron composition. These percentages may be varied, and other alloys may be used as long as the film exhibits the property of uniaxial anisotropy, as described by F. W. Pugh in *Physics of Thin Films*, Vol. 1, (pg. 300) Academic Press, 1963.

In essence, uniaxial anisotropy is a condition in which the magnetization of a material aligns itself either parallel or anti-parallel with a preferred axis. This condition is illustrated in FIG. 1 by a plurality of vectors 14 which represent the magnetizations of small regions on film 10. An axis 16 along which the magnetization vectors 14 are aligned is known in the art as the "easy axis," since it represents the axis parallel to which the magnetization prefers to align in the absence of an external field. In contrast, an axis 18 which, is perpendicular to axis 16, is known in the art as the "hard axis" because it represents an axis of relative instability for the magnetization. Consequently, the application of an external field is required to rotate the magnetization such that it is parallel with hard axis 18.

As will be familiar to those skilled in the art, a region where the magnetization is oriented in a particular direction is called a domain. Each domain is bounded by a domain wall which may be moved or repositioned by the application of external magnetic fields of sufficient intensity.

During the recording process, film 10 is subjected to a magnetic field of constant gradient in order to insure that the recorded image linearly represents the amplitude of the input signal.

Figure 2A:
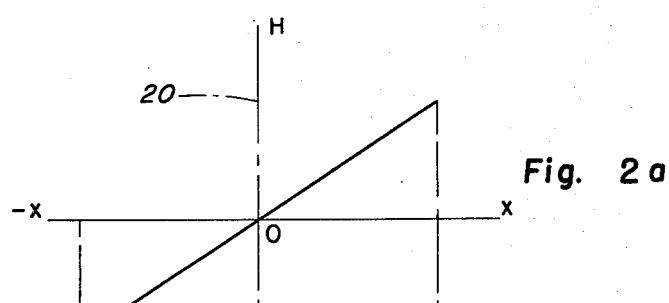
FIG. 2a is a graphical representation of a magnetic field of constant gradient.
Figure 2B:
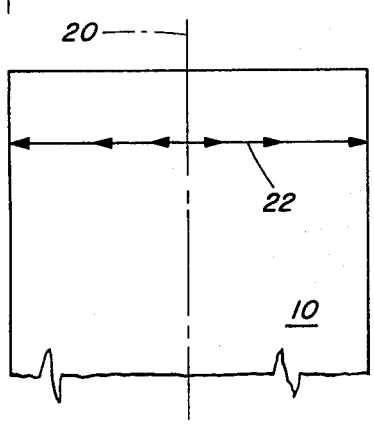
FIG. 2b is a schematic illustration of the influence of the field of FIG. 2a on the film of FIG. 1.

In FIG. 2a, a constant gradient field is shown as having a magnitude $-H$ at one edge $-x$ of film 10, which increases linearly through zero at a center line 20 to a maximum value of $H$ at the opposite edge $x$ of film 10. The minus sign, of course, may be interpreted merely as an indication of the direction in which the gradient field vector is oriented. FIG. 2b illustrates the effect of the linear gradient field on film 10 by means of a plurality of vectors 22, the magnitudes of which increase as distance from center line 20.

Recording is accomplished by reversing the magnetization of the film in such a manner that the entire magnetization of the film is essentially divided into domains separated by a domain wall which forms an outline or boundary representing the recorded signal. Signals to be recorded are generally of insufficient magnitude to cause these magnetization reversals or domain wall movements. Therefore, it is necessary to scan the film with a magnetic signal of sufficient intensity to cause rotation of the magnetization of the film to take place.

The scanning field, which is represented by a vector 24 on FIG. 1, is oriented parallel to hard axis 18. The magnitude of the scanning field must be sufficient to rotate the magnetization of the film 10, which is normally oriented parallel to easy axis 16, until it is roughly parallel with hard axis 18. The strength of the field required to achieve this rotation is determined by the nature of the film material. It has been found that the magnitude of the scanning field may be, for example, on the order of 10 times the maximum magnitude of the signal to be recorded. Passage of the scanning field represented by vector 24 along the length of film 10 rotates the magnetization of the film until it is approximately parallel with hard axis 18. In the absence of the constant gradient field, the rotated magnetization would relax back parallel to axis 16 through rotation in an arbitrary direction upon removal of scanning field 24. However, if the constant gradient field is present, it adds vectorially with scanning field 24 to produce a rotational bias on the film magnetization. If film 10 is strobed by scanning field 24 in the presence of the constant gradient field but with no input signal, the magnetization of the film is divided into two oppositely oriented domains separated by a domain wall along center line 20. Although this preliminary strobing operation is totally unnecessary for recording, the recording process is more easily visualized on a film thus symmetrically divided into two domains.

In recording, the signal to be recorded is applied parallel to axis 16 so that it is oriented either parallel or anti-parallel to gradient field represented by vectors 22. The signal to be recorded either adds to or subtracts from the gradient field, and consequently changes the bias on the rotated magnetization. By controlling the bias on the scanned magnetization, the signal to be recorded controls the direction in which the magnetization rotates upon removal of the scanning field. Therefore, once the signal to be recorded has been applied to the film and the film has been scanned, the magnetization rotates back in such a manner as to leave a permanently recorded image of the recorded signal on the film. This image is observable in the formation of the domain wall which, as explained above, may be oriented along center line 20.

Figure 3:
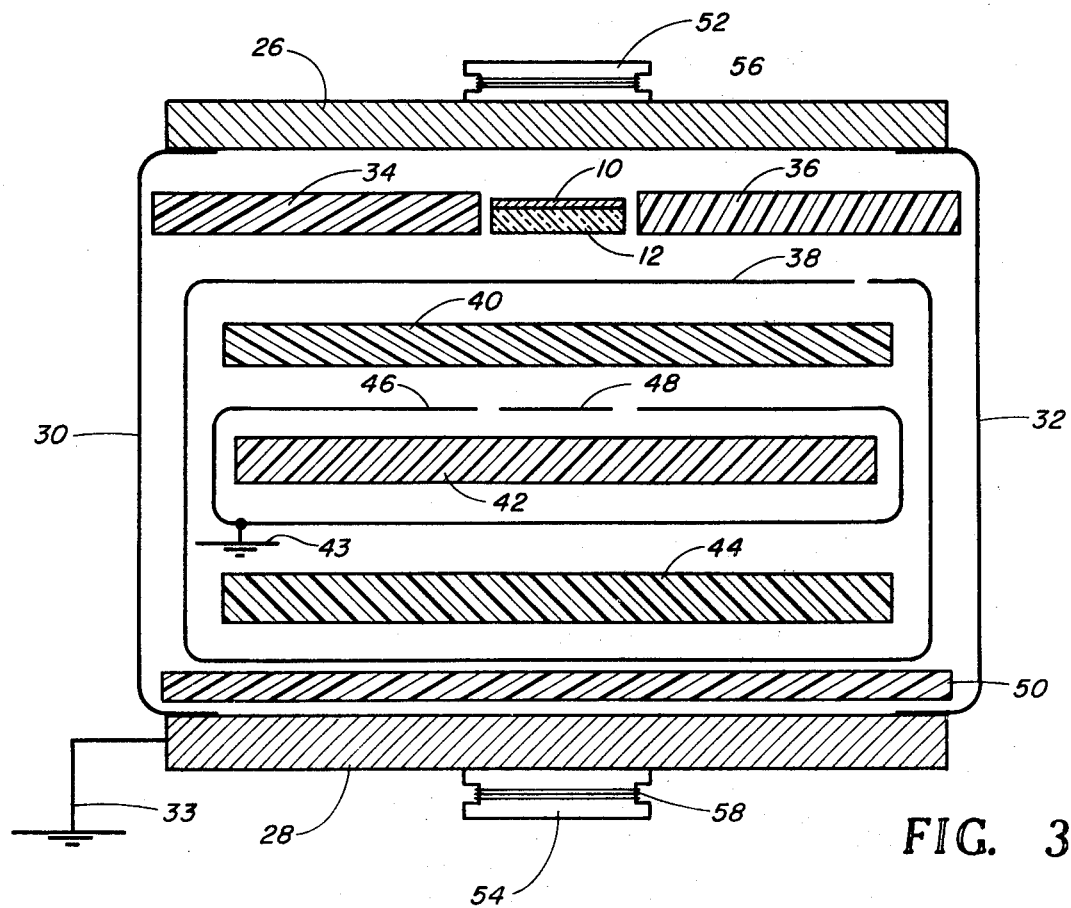
FIG. 3 is a frontal cross-section view of the preferred embodiment of the recording apparatus of the instant invention.
Figure 4:
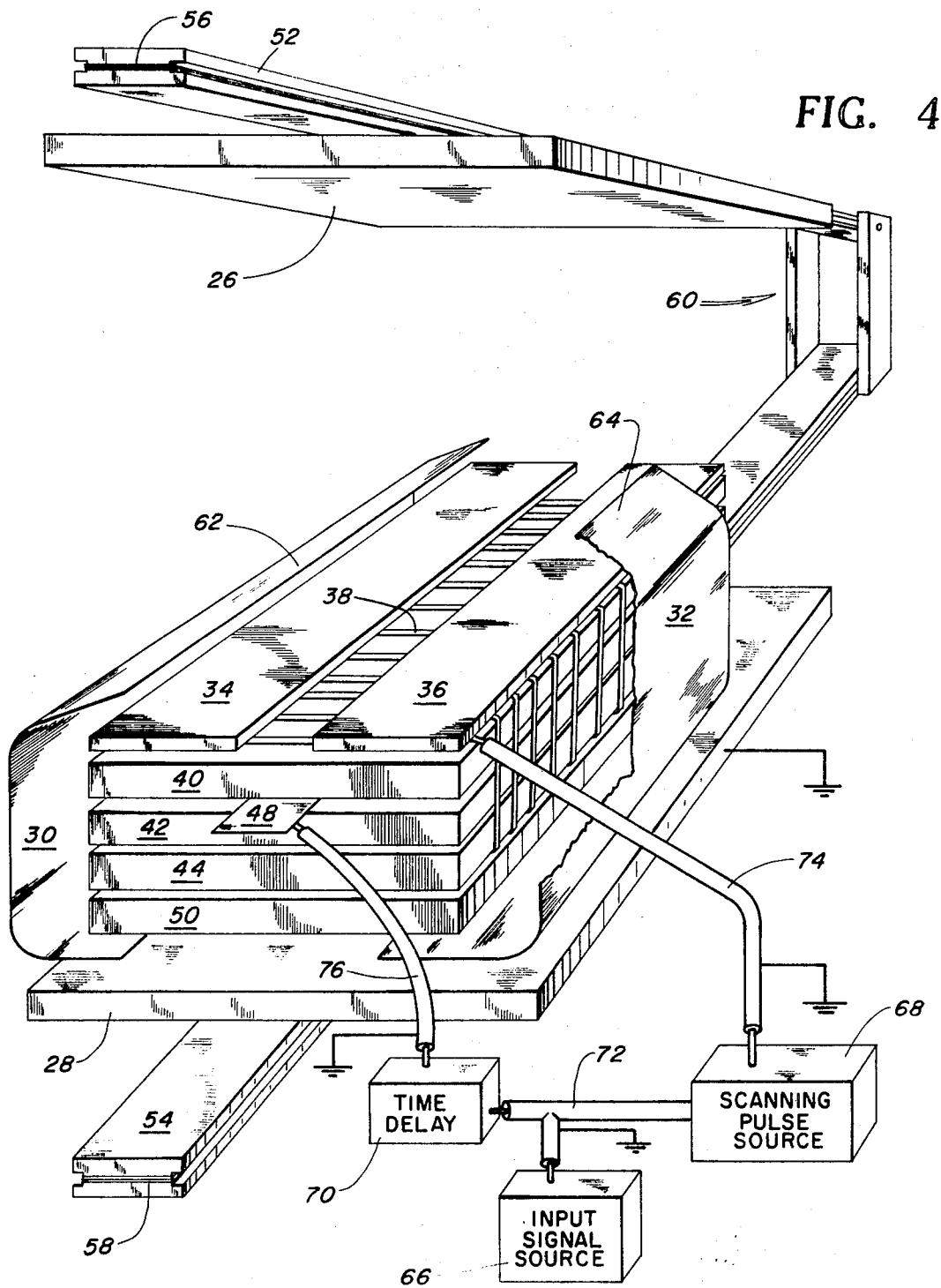
FIG. 4 is a perspective view of the preferred embodiment shown in FIG. 3.

One embodiment of an apparatus for accomplishing the recording function is shown more clearly in FIGS. 3 and 4. Referring now to FIG. 3 in which the separation between the conductive and nonconductive layers of the device has been exaggerated for purposes of illustration, a frontal cross-section of the device is shown. A pair of nonmagnetic conductive plates 26 and 28 which may be, for example, of aluminum metal, enclose the signal carrying components of the recording device. Conductive plates 26 and 28 are electrically interconnected by two nonmagnetic conductive sheets 30 and 32, respectively, which may be, for example, of copper metal. The continuous conductive surface consisting of plates 26 and 28 and sheets 30 and 32 is electrically connected to a reference potential or ground 33. Thus, plates 26 and 28 together with sheets 30 and 32 form a continuous ground plane that surrounds the recording device. Two rectangular plates of dielectric material 34 and 36 are mounted directly below conductive plate 26 and are laterally separated from each other by a gap sufficiently wide to accommodate film 10. It is desirable that dielectric slabs 34 and 36 be at least as thick as film 10 to support conductive plate 26 above the surface of film 10. Directly below dielectric plates 34 and 36 and below film 10, a scanning conductor 38 is mounted. Scanning conductor 38 consists of a flat relatively narrow strip of conductive material that is helically "wound" or positioned about a plurality of dielectric plates 40, 42 and 44 to extend the entire length of film 10. In practice, conductor 38 may consist of equally spaced strips of conductive material, such as copper, printed on a pair of dielectric plates 40 and 44. The printed conductive strips on plates 40 and 44 must be individually interconnected along the edges of the plates to form a continuous helical conductor. A dielectric plate 42, which is positioned between dielectric plates 40 and 44, is surrounded by a nonmagnetic conductive sheet 46 which may be of copper, and which is connected to a reference potential or ground 43. A strip of material 48 is cut from conductive sheet 46 at a position directly below film 10 to apply the signal to be recorded to film 10. This strip is of approximately the same width as film 10 and is separated by a small amount of space on either side from conductive sheet 46. An additional dielectric plate 50 is positioned below dielectric plate 44 to insulate the lower portion of scanning conductor 38 from conductive plate 28.

A pair of nonmagnetic frames 52 and 54 are secured to the outer surfaces of conductive plates 26 and 28, respectively. These frames carry coils of conductive wire 56 and 58 to provide the field of constant gradient described hereinbefore.

The layered structure of the device is important because it allows juxtaposition of ground planes and signal carrying conductors. This configuration permits scanning conductor 38 to be surrounded at nearly all points by ground planes, thus giving it an electrical configuration very similar to a coaxial cable, a feature necessary to allow the transmission of scanning pulses with a minimum of electrical loss. It will be apparent to those skilled in the art that scanning conductor 38, in cooperation with its surrounding ground planes, functions as a delay line for transmitting scanning pulses along film 10.

The helical nature of conductor 38 may be better appreciated by reference to FIG. 4, which illustrates in perspective the physical embodiment of the recording device of the instant invention. In this view, conductive plate 26 has been rotated up away from the main body of the recorder and film 10 has been removed from its position between dielectric plates 34 and 36 to permit a clearer view of scanning conductor 38. It will be observed that conductive plate 26 and frame element 58 may be coupled to the lower portion of the recording device in any conventional manner, such as by a hinge structure 60. Nonmagnetic conductive sheets 30 and 32 may have flexible upper portions 62 and 64, respectively, which engage and make electrical contact with conductive plate 26 when it is rotated into engagement with the main body of the recording device.

The external electronic equipment required to operate the recording device includes an input signal source 66, a scanning pulse source 68 and a time delay 70. Input signal source 66 is coupled through a coaxial cable 72 to both scanning pulse source 68 and time delay 70. Scanning pulse source 68 is coupled through a coaxial cable 74 to scanning conductor 38, and thus to the delay line formed of scanning conductor 38 and its surrounding ground planes. Scanning pulses transmitted from source 68 enter the scanning conductor 38 and progress through it along the recording device so as to scan the length of film 10 when it is located in its normal position between dielectric plates 34 and 36.

Time delay 70 is coupled through a coaxial cable 76 to input signal conductor 48, which lies directly below the position normally occupied by film 10. In operation, an input signal from source 66 triggers a scanning pulse from source 68 which then begins scanning the film as it progresses along the delay line described above. The same pulse from source 66 is temporarily delayed by time delay 70 and is then fed into the input conductor 48 to be recorded on film 10. Time delay 70 may be eliminated if an external device is provided to control the triggering of the scanning pulse in properly timed relation to the application of the input signal pulse.

Signal source 66 may be any type of transducer capable of delivering an electrical impulse in response to the detection of a physical event. However, if an existing magnetic field is to be recorded, the input signal source 66 may be dispensed with entirely. In that case, it is only necessary that the recording device be subjected to the magnetic field to be measured and that the scanning pulse source 68 be triggered at the proper moment to record the desired magnetic signal.

The input signal may be applied to coaxial cable 74 so that it progresses down the delay line formed of conductor 38 and its surrounding grounded planes. It is then necessary to apply a pulse to conductor 48 to complete the recording operation. It will be understood that the easy and hard axes of the film must be interchanged and the constant gradient field must be reoriented parallel to the new easy axis when the recorder is used in this manner.

It is also possible to modify the device to make a plurality of recordings with a single scanning pulse. This may be accomplished by widening the recording device to the extent that several films 10 may be placed side by side in the gap between dielectric plates 34 and 36. A series of input conductors 48 may then be added with each input conductor beneath a separate film and each connected to a separate input signal source. Then a single scanning pulse passed beneath the plural films through scanning conductor 38 and the delay line associated therewith will be sufficient to accomplish recording on each of the plurality of films so arranged. When equipped with multiple films the device can be further used to provide a record of a signal having large amplitude excursions which could not be recorded on a single film. This is accomplished by applying the input signal simultaneously to several films, while attenuating it to a different degree as it is applied to each film. The combined films will then contain a complete record of the applied input.

At the completion of the recording operation, film 10 is physically removed from its position between dielectric plates 34 and 36 to be stored or analyzed.

The information recorded on film 10 may be read out by electronic techniques, which are the subject of copending application Ser. No. 884,103, filed Dec. 11, 1969, or by visually observing the Bitter patterns produced by the recorded information. Bitter patterns may be observed by applying a soap solution containing a suspension of fine iron oxide particles directly to the surface of film 10. The iron oxide particles are attracted by the forces of stray fields created by the domain boundaries along the profile of the recorded signal. The particles migrate through the solution under the influence of these stray fields until the recorded signal is completely outlined. This signal outline may be visually observed and photographed on evaporation of the soap solution.

Numerous modifications of the recording device of the instant invention are possible without impairing its recording ability. For example, conductor 38 may be wound about dielectric plates 40, 42 and 44 with a circular curvature to provide a gradient field component along the easy axis 16 of film 10, thereby eliminating the need for gradient coils 56 and 58.

It is possible to deposit the film in the presence of a magnetic field gradient which will create a nonuniformity in easy axis direction such that a linear recording can be made in the absence of a constant gradient field.

Scanning conductor 38 need not be wound in turns of equal length, causing the scanning pulse to be propagated along the film 10 at a linear rate. Instead, the windings may be of variable length to provide nonlinear scanning functions, such as a logarithmic progressive, for example.

Figure 5:
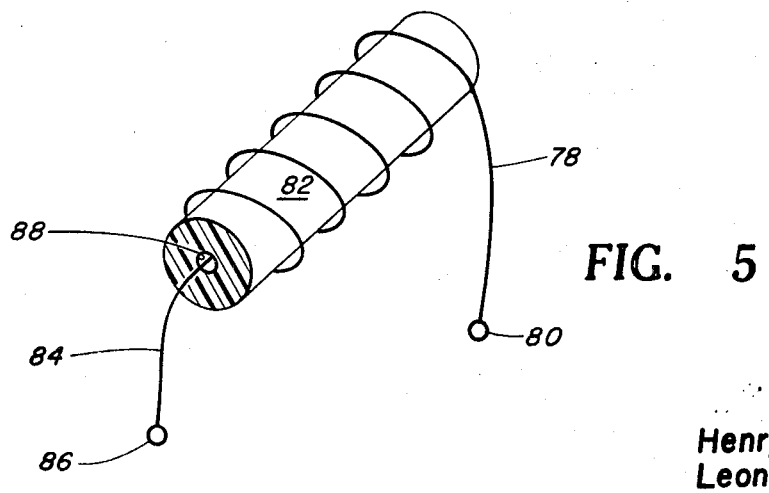
FIG. 5 is a perspective view of an alternative embodiment of the invention.

In addition, the entire recording apparatus may be constructed in a variety of geometrical configurations. An example of an alternative embodiment is the cylindrical configuration shown in FIG. 5 having a scanning conductor 78 with a scanning input terminal 80 wound helically about a cylindrical dielectric body 82. An input conductor 84, having an input terminal 86 such as a copper wire, is inserted into a small diameter bore 88 along the central axis of dielectric body 82. The recording thin film 10 may be coated directly onto the surface of conductor 84 in this embodiment of the invention.

Obviously, numerous additional modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A recording apparatus comprising:
   a thin film of uniaxially anisotropic magnetic material having easy and hard axes of magnetization;
   means for scanning said film with a magnetic field oriented by said hard axis;
   means for producing a magnetic field having a constant gradient acting on said film; and
   means for subjecting said film to the field generated by a signal to be recorded, said signal field oriented parallel to said easy axis;
   whereby said signal is magnetically recorded on said film.

2. A recording apparatus as recited in claim 1 wherein:
   said scanning field is greater than said signal field; and
   said constant gradient field is oriented parallel to said easy axis.

3. A recording apparatus as in claim 1 wherein said means for producing a field of constant gradient comprises a plurality of conductive coils.

4. A recording apparatus as in claim 1 wherein said means for producing a magnetic field of constant gradient comprises a pair of conductive coils disposed on either side of the film and oriented parallel to said hard axis.

5. A recording apparatus as in claim 1 wherein said scanning means comprises a delay line including a conductor helically wound about a dielectric body.

6. A recording apparatus as in claim 5 wherein said dielectric body is a cylindrical solid, and said thin film is coated on a conductor disposed along the axis of said cylindrical solid.

7. A recording apparatus as in claim 5 wherein said means for producing a field of constant gradient comprises said conductor wound in a circular helical configuration about said dielectric body.

8. A recording apparatus as in claim 5 wherein said means for subjecting said film to the field generated by a signal to be recorded comprises a second conductor mounted in said dielectric body and oriented parallel to the axis of said helical winding.

9. A method of magnetically recording a signal comprising the steps of:
   scanning a thin film of uniaxially anisotropic magnetic material having easy and hard axes of magnetization with a magnetic field oriented parallel to said hard axis of magnetization
   subjecting said thin film to a magnetic field of constant gradient oriented parallel to said easy axis; and
   applying a signal field to be recorded to said film oriented parallel to said easy axis of magnetization.

* * * * *